United States Patent [19]
Barth et al.

[11] Patent Number: 4,710,416
[45] Date of Patent: Dec. 1, 1987

[54] CORE STRUCTURE FOR USE IN A SEAL

[75] Inventors: Russell W. Barth, Upper Sandusky; Ronald P. Buess, Wharton, both of Ohio

[73] Assignee: Uni-Grip, Inc., Upper Sandusky, Ohio

[21] Appl. No.: 721,233

[22] Filed: Apr. 8, 1985

[51] Int. Cl.$^4$ .............................................. B32B 7/00
[52] U.S. Cl. ..................................... 428/119; 428/105; 428/114; 428/292; 428/294; 428/343; 428/344; 428/354
[58] Field of Search ............... 428/343, 344, 354, 356, 428/457, 358, 31, 122, 292, 105, 114, 294, 108, 119

[56] References Cited

U.S. PATENT DOCUMENTS

| | | | |
|---|---|---|---|
| 3,167,856 | 2/1965 | Zoller | 428/122 |
| 3,222,769 | 12/1965 | Le Plae | 428/122 |
| 3,993,819 | 11/1976 | Fewkes | 428/358 |
| 4,168,340 | 9/1979 | Buyssens et al. | 428/294 |
| 4,304,816 | 12/1981 | Bright et al. | 428/358 |
| 4,310,164 | 1/1982 | Mesnel | 428/122 |
| 4,339,860 | 7/1982 | Hayashi | 428/31 |
| 4,546,021 | 10/1985 | Mears | 428/31 |

FOREIGN PATENT DOCUMENTS 2048715 12/1980 United Kingdom ............... 428/344

Primary Examiner—James J. Bell
Attorney, Agent, or Firm—MacMillan & Sobanski

[57] ABSTRACT

The present invention concerns an apparatus and method for making a core structure for use in a seal assembly, trim assembly, and the like. According to the method of the present invention, a plurality of individual core segments of resilient material such as metal are conveyed along a predetermined path in spaced apart unattached relationship to one another. Next, a first strip of flexible material such as fiber reinforced adhesive tape is applied to one surface of the segments as they travel along the predetermined path and subsequently, and a second strip of flexible material is attached to the opposite surface of the segments. In the preferred embodiment of the apparatus of the invention, the individual segments are conveyed by utilizing a rotatable wheel having a plurality of individual spaced apart recesses formed therein, which are adapted to successively receive the individual segments.

3 Claims, 5 Drawing Figures

CORE STRUCTURE FOR USE IN A SEAL

BACKGROUND OF THE INVENTION

The present invention relates generally to an apparatus and method for producing a core structure for use in reinforcing a rubber or plastic trim element. Such trim elements can be used for protecting, trimming and sealing edge or joint portions of automobiles, furniture, and the like, or can be used for attaching weatherstripping or other similar articles to various types of straight or curved structures. The present invention also concerns a core structure manufactured by the method and apparatus of the present invention.

Trim elements of the type described above are well known, and generally include a reinforcing core member embedded in a main body of rubber or synthetic resin. Since the trim elements are generally required to be flexible and deformable in accordance with the contour of the place where the trim is to be attached, it is important that the associated core member not obstruct the trim element from readily and freely bending or twisting.

Various types of core members have been proposed for increasing the overall flexibility of a trim element, while also providing a desired amount of reinforcement. One such type of core member is disclosed in U.S. Pat. No. 4,339,860 to Hayashi. In this patent, the core member is constructed of a single strip of metal which is stamped to produce a series of spaced apart rectangular segments connected by integral deformable bridge portions.

U.S. Pat. No. 3,167,856 to Zoller discloses a trim element having a core structure consisting of a plurality of spaced apart metal segments which are unconnected to one another.

U.S. Pat. No. 4,046,940 to Prikkel discloses a core structure wherein a plurality of spaced apart individual metal segments are attached to one another by means of a pair of flexible continuous fiber cords such as cotton, for example.

U.S. Pat. No. 4,310,164 to Mesnel discloses a trim structure wherein a substantially inextensible non-metallic strand like member is embedded between the rubber sealing strip and the metal core member in order to control and locate the mean bending zone of the trim structure.

Finally, U.S. Pat. No. 4,304,816 to Bright et al discloses a core structure wherein a series of spaced apart metal segments connected by integral metal connecting links has a flexible substantially inextensible member such as fiber reinforced adhesive tape applied longitudinally along the core structure.

SUMMARY OF THE INVENTION

The present invention concerns a core structure of the type utilized in a seal assembly, trim assembly, and the like, and a unique method and apparatus for constructing such a core structure. The core structure of the present invention includes a plurality of individual segments of resilient material such as metal which are positioned in spaced apart relationship to one another, and at least one strip of flexible substantially inextensible adhesive tape adhered to and extending along one side of each of the segments such that the individual segments are coupled together only by the adhesive tape strips. In the preferred embodiment of the invention, the core structure has a plurality of individual tape strips applied to each side of the segments.

The method of the present invention includes the step of conveying a plurality of individual segments of resilient material along a predetermined path in spaced apart, unattached relationship to one another, and then subsequently attaching a strip of flexible material to one side of the segments as they travel along the predetermined path, thereby producing the core structure. In the apparatus of the present invention, the means for conveying includes a rotatable wheel having a plurality of individual spaced apart recesses formed therein, and means located adjacent the periphery of the wheel for successively placing the individual segments in the recesses. In the preferred embodiment of the invention, a first strip of tape is applied to the one side of the segments which faces generally upwardly and, subsequently, the segments having the first strip attached thereto are inverted such that the opposite side of segments faces generally upwardly to enable a second strip of tape to be attached thereto.

It has been found that a core structure manufactured with the apparatus and the method of the present invention provides several advantages over the prior art core structures. First, the individual core segments can be stamped from a single strip of metal, with no waste from the stamping operation. Moreover, the individual adhesive tape strips provide a very effective means for maintaining the strips in spaced apart relationship, while simultaneously providing a flexible core structure which can easily conform to the contour of the surface on which it is to be mounted.

BRIEF DESCRIPTION OF THE DRAWINGS

The above, as well as other advantages of the present invention, will become readily apparent to one skilled in the art from reading the following detailed description of the invention in conjunction with the attached drawings in which.

DESCRIPTION OF THE PREFERRED EMBODIMENT

Figure 1:
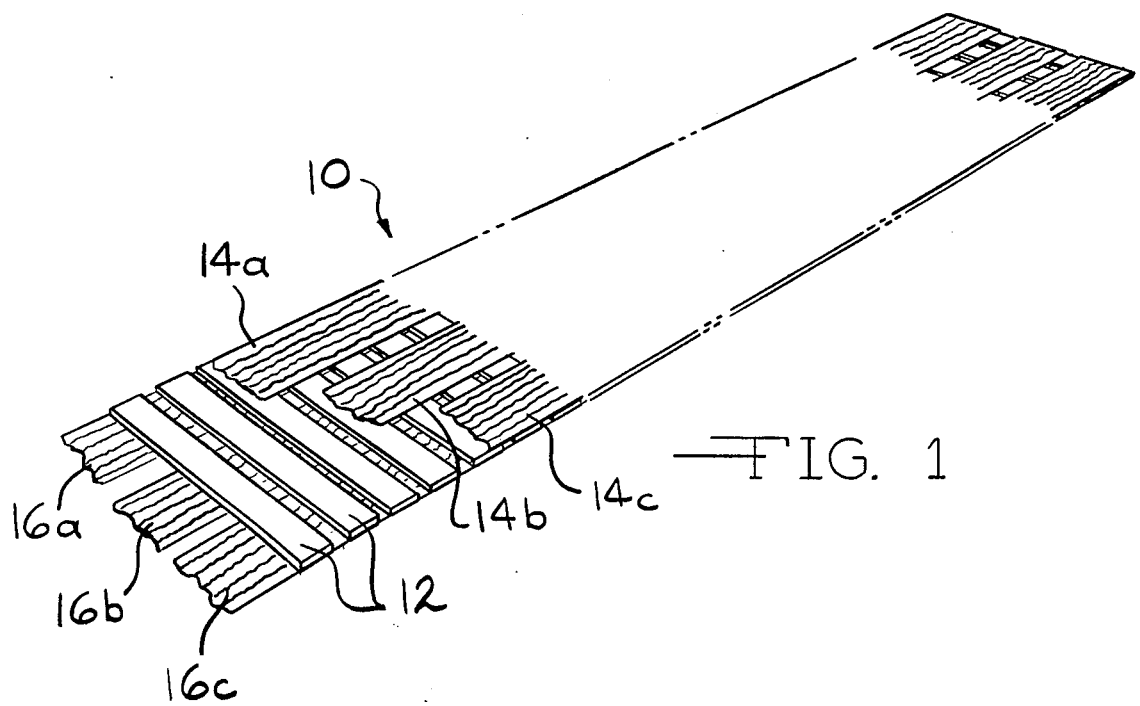
FIG. 1 is a perspective view illustrating a core structure manufactured according to the method and apparatus of the present invention wherein a series of spaced apart individual metal strips have a plurality of adhesive tape strips applied to the upper and lower surface thereof.

Referring to FIG. 1, there is shown a core structure 10 which is manufactured by the method and apparatus according to the present invention. In particular, the core structure 10 comprises a plurality of individual segments 12 constructed of a resilient material such as, for example, a low carbon steel. A first plurality of flexible strips 14a, 14b and 14c are attached to the upper surface of the segments 12 and extend along the longitudinal axis of the core structure, while a plurality of flexible strips 16a, 16b and 16c are attached to the lower surface of the segments 12. Preferably, the flexible strips are constructed of a substantially inextensive material such as, for example, fiber reinforced tape. It is important to note that the individual segments 12 are coupled to one another only by the tape strips.

While the core structure shown in FIG. 1 can be utilized as a core member for a variety of sealing and trimming structures, it has been found especially effective for use as a core member in a vehicle weatherstrip structure of the type disclosed in U.S. Pat. No. 4,046,940, which is herein incorporated by reference. Generally, the core member 10 is embedded within a rubber or synthetic resin outer casing by a well known extruding operation. Typically, the individual segments 12 can then be formed in a U-shape to enable the weather stripping structure to be clamped to an edge flange of the vehicle body.

Figure 2:
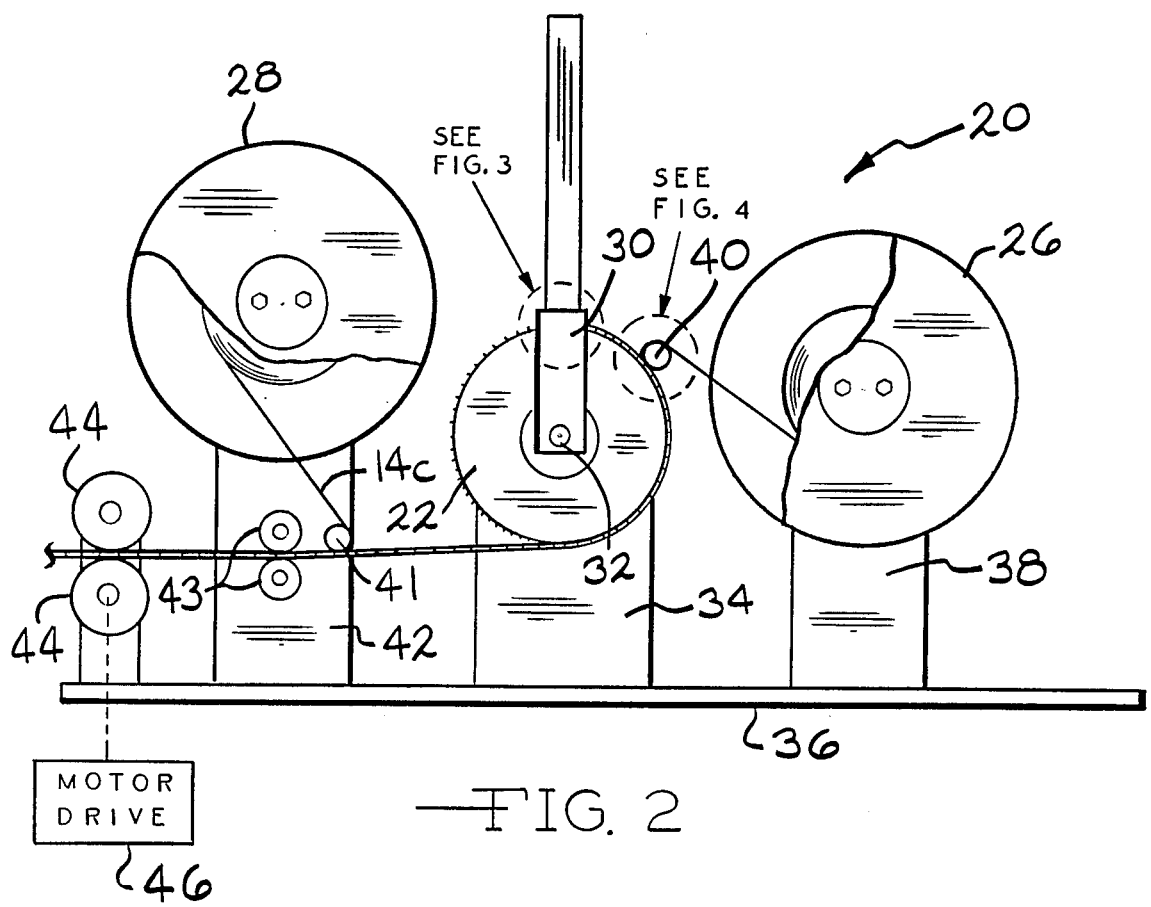
FIG. 2 is a side elevational view illustrating the apparatus for producing the core structure illustrated in FIG. 1.

Referring to FIG. 2, there is shown a side view of an apparatus 20 which can be utilized to produce the core structure of FIG. 1. Generally, the apparatus 20 includes a rotatable spacing wheel 22, a magazine 24 containing a vertically stacked arrangement of individual segments 12, a first spool 26 containing rolls of the individual strip materials 16a, 16b and 16c, and a second spool 28 containing rolls of the individual strip materials 14a, 14b and 14c.

Figure 3:
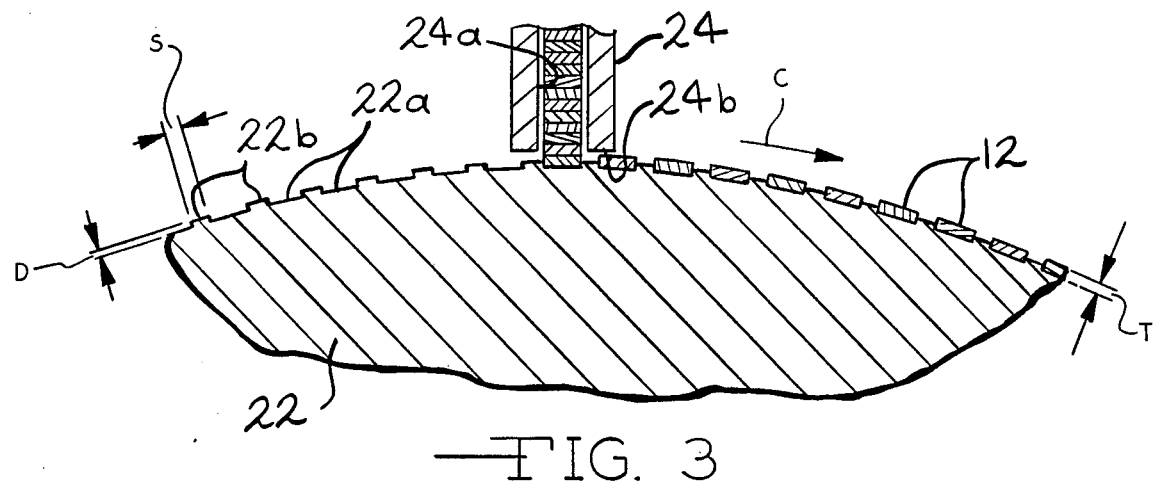
FIG. 3 is an enlarged sectional view of the portion of FIG. 2 wherein the individual metal segments are successively placed within individual recesses formed in a rotatable wheel.

The lower end of the magazine 24 is positioned adjacent the top of the spacing wheel 22 by means of a support member 30 secured to a shaft 32 about which the wheel 22 rotates. As shown in FIG. 3, the magazine 24 is provided with a vertically extending cavity 24a having a cross-sectional rectangular opening slightly larger than the rectangular dimensions of an individual segments 12. The individual segments 12 are either manually or automatically placed in vertically stacked arrangement within the cavity 24a.

As shown in FIG. 2, the spacing wheel 22 is rotatably mounted on a support 34 secured to a base 36. The wheel is utilized to convey the individual segments 12 along a predetermined path in spaced apart unattached relationship to one another. As shown in FIG. 3, the wheel is provided with a plurality of individual recesses 22a which are spaced apart by radial projections 22b such that, as the wheel 22 is rotated in a clockwise direction C as viewed in the drawings, individual segments 12 are successively placed within the recesses 22a and the segments are conveyed along an arcuate path in spaced apart, unattached relationship to one another. As the segments 12 are conveyed along the arcuate path defined by the periphery of the wheel 22, they will be spaced apart by distance S which is the width of the individual radial projections 22b. It is important to note that the lowermost end 24b of the magazine 24 extends downwardly sufficiently to insure that only a single segment 12 is placed within each recess 22a. Also, it is should be noted that the recesses 22a are formed with a depth D which is less than the thickness T of the individual segments 12.

Figure 4:
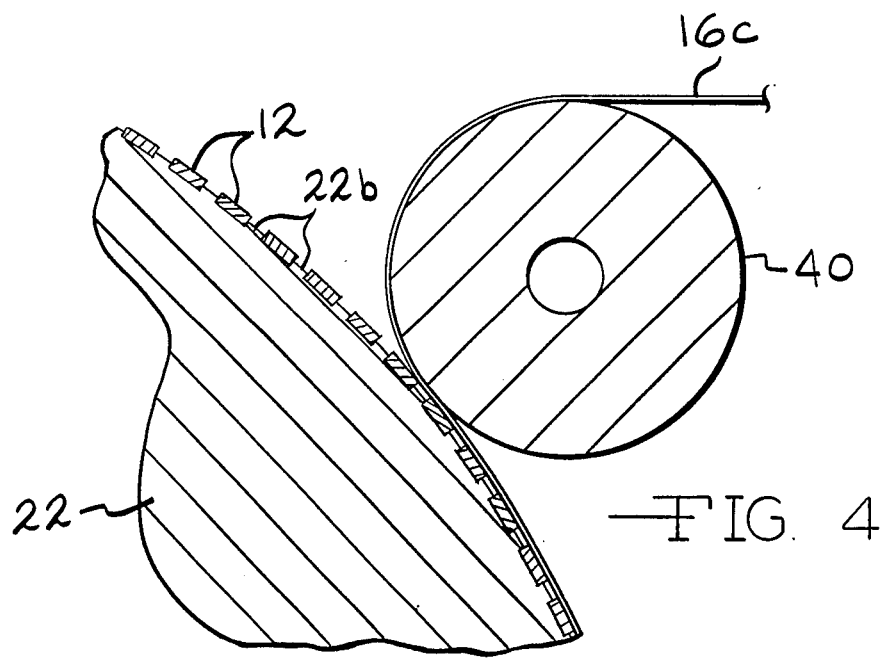
FIG. 4 is a sectional view of the portion of FIG. 2 wherein the adhesive tape strips are applied to one surface of the individual metal segments as they travel in an arcuate path.
Figure 5:
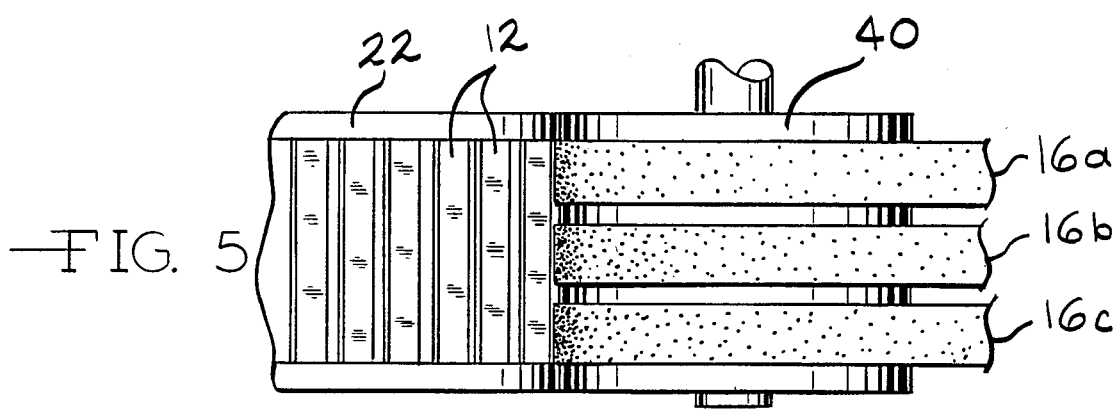
FIG. 5 is a plan view taken along the line 5—5 of FIGS. 2 and 4 and showing a group of three adhesive tape strips as they are simultaneously applied to an upwardly facing surface of the individual segments.

As shown in FIG. 2, the first spool 26 which carries the tape strips 16a, 16b, and 16c is rotatably mounted on a support 38 secured to the base 36. As the individual segments 12 travel along the arcuate path, the adhesive tape strips 16a, 16b and 16c carried by the first spool 26 are applied to the upwardly facing surface of the segments 12 in a manner as shown in FIGS. 4 and 5. In FIGS. 4 and 5, a roller 40 is utilized to press the individual strips 16a, 16b and 16c onto the one surface of the segments. While not shown in the drawings, means can be provided for maintaining the individual strips in spaced apart relationship. Also, means can be provided to insure that the outside strips 16a and 16c are applied adjacent the outer marginal edges of the segments 12. As shown in FIG. 4, the adhesive face of the tape strips contacts only the upwarding facing surface of the segments 12, and does not contact the radial projections 22b of the spacing wheel 22.

As shown in FIG. 2, after the tape strips 16a, 16b and 16c have been applied to one surface of the segments 12, the wheel causes the segments 12 to be inverted such that the surfaces of the segments 12 to which the tape strips 16a, 16b and 16c were supplied now faces downwardly. As the segments pass a second roller 41, the tape strips 14a, 14b and 14c carried by the second spool 28 can be attached to the opposite surface of the segments which now faces upwardly. The second spool 28 is rotatably mounted on a support 42 secured to the base 36.

A pair of final press rollers 43 can be provided for insuring that each of the tape strips is firmly pressed onto the individual segments. Also, a pair of pull rollers 44 can be coupled to a suitable motor drive unit 46 for pulling the assembled core structure through the entire assembly operation.

It should be noted that, in some instances, it may be desirable to apply adhesive tape only to one side of the spaced apart individual segments and, also, it may be desirable to apply fewer than three strips of tape to each side of the structure.

In accordance with the provisions of the patent statutes, the principle and mode of operation of the present invention have been illustrated and described in what is considered to represent the preferred embodiment. However, it should be noted that the present invention may be pacticed otherwise than as specifically illustrated and described without departing from the scope of the following claims.

What is claimed is:

1. A core structure for use in a seal assembly, trim assembly, and the like, comprising:
    a plurality of individual core segments of resilient material positioned in spaced apart relationship to one another, and at least one strip of flexible substantially inextensible adhesive tape adhered to and extending along one surface of each of said segments, said segments being coupled together only by said tape strips, each of said tape strips extending in a direction perpendicular to the length of each said segment and being substantially narrower than the length of each said segment.

2. The core structure according to claim 1 wherein said strip is a first strip and including a second strip of flexible substantially inextensible adhesive tape adhered to and extending along the opposite surface of each of said segments.

3. The core structure according to claim 1 wherein said core segments are constructed of metal.

* * * * *